US012124240B1

United States Patent
Ghare et al.

(10) Patent No.: US 12,124,240 B1
(45) Date of Patent: Oct. 22, 2024

(54) HETEROGENOUS ROBOT FLEET MANAGER

(71) Applicant: Amazon Technologies, Inc., Seattle, WA (US)

(72) Inventors: Gaurav D Ghare, Seattle, WA (US); Eric D Anderson, Stow, MA (US); Bin Zhu, Seattle, WA (US); Abraham Cantwell, Somerville, MA (US); Thomas Alexandre Moulard, Mountain View, CA (US); Ibolya Horvath, Pembroke, NH (US); Chetan Banthiya, Bothell, WA (US); David Prody, Gilbert, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 244 days.

(21) Appl. No.: 17/710,599

(22) Filed: Mar. 31, 2022

(51) Int. Cl.
G05B 19/4155 (2006.01)
G05D 1/00 (2006.01)

(52) U.S. Cl.
CPC ....... *G05B 19/4155* (2013.01); *G05D 1/0297* (2013.01); *G05B 2219/50391* (2013.01)

(58) Field of Classification Search
None
See application file for complete search history.

(56) References Cited

U.S. PATENT DOCUMENTS

| 8,886,390 | B2 | 11/2014 | Wolfe et al. | |
| 10,022,867 | B2 | 7/2018 | Saboo et al. | |
| 10,089,586 | B2 | 10/2018 | Vestal et al. | |
| 2014/0365258 | A1* | 12/2014 | Vestal | G16H 40/20 901/1 |

OTHER PUBLICATIONS

Kong et al. ("Multi-robot Task Allocation Strategy based on Particle Swarm Optimization and Greedy Algorithm") (Year: 2019).*
Banfi et al. (" Hierarchical Planning for Heterogeneous Multi-Robot Routing Problems via Learned Subteam Performance") (Year: 2022).*
Czarnecki et al. ("Hedonic Coalition Formation for Task Allocation with Heterogeneous Robots") (Year: 2019).*
Li et al. ("Distributed Near-optimal Multi-robots Coordination in Heterogeneous Task Allocation") (Year: 2020).*

* cited by examiner

*Primary Examiner* — Khoi H Tran
*Assistant Examiner* — Bryant Tang
(74) *Attorney, Agent, or Firm* — Alexander A. Knapp; Kowert, Hood, Munyon, Rankin & Goetzel, P.C.

(57) ABSTRACT

A management system for a heterogenous robot fleet provides standard application programmatic interfaces (APIs) for use by inventory management systems in generating complex applications, wherein calls to the API are formatted in a standard format and cause the management system to orchestrate cross-fleet operations that involve multiple different types of robots that are operating in a common facility. Also, the management system for a heterogenous robot fleet provides a unified view of the heterogenous robot fleets of the facility.

20 Claims, 9 Drawing Sheets

HETEROGENOUS ROBOT FLEET MANAGER

BACKGROUND

Businesses and other organizations often utilize varying degrees of automation to manage operations. For example, stationary and/or mobile robots may be used in a facility to move material from one place to another and/or to perform various other tasks. Often such facilities include more than one type of automation device, such as different robots manufactured by different manufacturers and/or robots of different types.

There is currently not a standardized communication protocol for communicating with robots, and robot manufacturers use their own proprietary protocols for controlling their robots. Also, some manufacturers utilize different protocols for communicating with different types of robots manufactured by the same manufacturer. In addition to varying communication protocols, other aspects of robot control may vary between types of robots and/or between robots manufactured by different manufacturers, such as task definitions, status information formats, status definitions, location information formats, etc. Due to such variation, it is often complicated and cumbersome to manage a heterogenous fleet of robots that operate in a facility, wherein the heterogenous fleet of robots include robots of more than one type and/or robots manufactured by different manufacturers. For example, managing a heterogenous system requires a facility operator to manage the various unique types of robots using multiple different communication protocols, task definitions, status definitions, location formats, status formats, task formats, etc.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein disclose a management system for managing a heterogenous robot fleet at a facility, wherein a centralized control system (e.g., the management system for managing a heterogenous robot fleet) manages a plurality of robots of differing types. In some embodiments, the management system for the heterogenous robot fleet manages the different types of robots directly and/or manages groups of the robots of the heterogeneous robot fleet via respective fleet managers for the respective robot types.

Additionally, facilities may include an inventory management system, wherein different facilities with different types of robots also have variability with regard to inventory management system configurations. Thus, integrating an inventory management system such that it interacts with a robot control system adds a further layer of complexity. However, a management system for managing a heterogenous robot fleet at a facility, as disclosed herein, comprises interfaces that are configured to receive inventory management instructions and/or data requests from various types of inventory management systems and translate such instructions or requests into a standardized format that can then be used by a task manager of the management system for the heterogenous robot fleet to carry out the instructions and/or to provide the requested data. For example, data about robots may be stored in a fleet registry and a request for robot data from an inventory management system may be translated, by an inventory management system interface, into a request format that is compatible with the fleet registry.

In some embodiments, a management system for managing a heterogenous robot fleet at a facility is configured to measure and report demand on a robot fleet, track the state of resources within the robot fleet, and provides extensible solutions for coordinating multi-robot tasks. For example, a management system for managing a heterogenous robot fleet enables integration across different equipment types with a vendor agnostic solution for monitoring and optimizing performance of a multi-robot fleet. In some embodiments, in order to provide such management, a management system for managing a heterogenous robot fleet is configured to establish common data models and interfaces across multiple types of equipment, enabling rapid integration of any robot and use case into enterprise operations. This provides a unified fleet management solution that empowers customers to maximize productivity through a single user application experience, equipped with analytics, visualization, and operational tools.

In some embodiments, a management system for managing a heterogenous robot fleet provides a management system that provides a pluggable framework with adapters to support specific types of robots or robots manufactured by various robot manufacturers. For example, the management system for managing a heterogenous robot fleet enables cross fleet features and integrations, by using a centralized management system that can communicate with various different types of robots using appropriate adapters. Additionally, in some embodiments, a management system for managing a heterogenous robot fleet maintains a fleet registry. The fleet registry provides a centralized registry for all the fleets of robots (e.g., robot fleets) in the facility. A centralized registry enables providing inventory management systems and operators with a single "pane of glass" to get a holistic view of all the robots across robot and vendor types in their facilities, the location of the robots, and status information for the robots, such as charge level, operational or in-maintenance status, etc. The fleet registry may include a versioned data model that captures common fleet and robot meta-data and enables customers or vendors to include additional meta-data that might be useful to the customers. The fleet registry also includes application programmatic interfaces (APIs) to support customer and vendor systems integration with the fleet registry, such as for enabling customer or vendors to manage the robots in their fleets e.g., to update robot location or charge level and/or to provide this information for use in their vendor specific fleet management system, etc.

In some embodiments, a management system for managing a heterogenous robot fleet maintains a destination registry for destinations in a facility, such as stations, workcells, etc. at which a robot may perform work or to which a robot may be directed to travel. The destination registry may comprise a simplified, high-level representation of a facility map for the facility, and may further include destinations or points of interest of the facility that are marked on the map and used to support cross-fleet task allocation and planning. The information represented in the destination registry may include processes supported at a destination, current capacity of a process at a destination, current availability of the process at the destination, a relationship of a destination to other destinations, etc. The destination registry may comprise a versioned, extensible data model for representing the high-level facility and destination information. The destination registry may be provided with APIs for inventory management systems to integrate with the destination registry to perform cross-fleet or vendor and fleet specific task allocation and management. Note, robot vendor systems may separately have detailed map representations in their own systems to perform activities such as robot path planning, etc.

In some embodiments, a management system for managing a heterogenous robot fleet maintains a centralized task registry for the tasks that all the robot fleets in the facility need to perform. The task registry enables capturing the overall demand across the robot fleets, tasks assigned to specific robot fleets, and tasks or activities assigned to specific robots. Like the fleet registry, the task registry is also implemented using a versioned and extensible data model and includes APIs to support customer and robot vendor systems integration.

In some embodiments, a management system for managing a heterogenous robot fleet comprises a task manager configured to get information from the fleet, destination, and task registries to perform cross-fleet assignments and delegate fleet specific assignments to fleet-specific task managers. Examples of cross-fleet assignments include distributing tasks (e.g., demand across different robot fleets), assigning common missions (e.g., charging and idling), improving cross-fleet performance at path intersections or shared spaces (e.g., crossings, dead-ends, narrow corridors, etc.).

In some embodiments, a management system for managing a heterogenous robot fleet further provides a user portal and/or console. The user portal or console can be used by technicians for resource provisioning and can also be used by facility operators for visualization, monitoring, etc.

In some embodiments, a management system for managing a heterogenous robot fleet further comprises a robot status and location updater that updates the registries with current robot status, location, and environment changes that might affect the fleet e.g., blockage in paths, closures, charge levels, etc. These updates enable the task managers and optimizers to update task allocation and routes if necessary to optimize overall efficiency, assign charging and idling missions, and enable customers to redistribute robots across adjacent buildings based on variance in demand.

Figure 1:
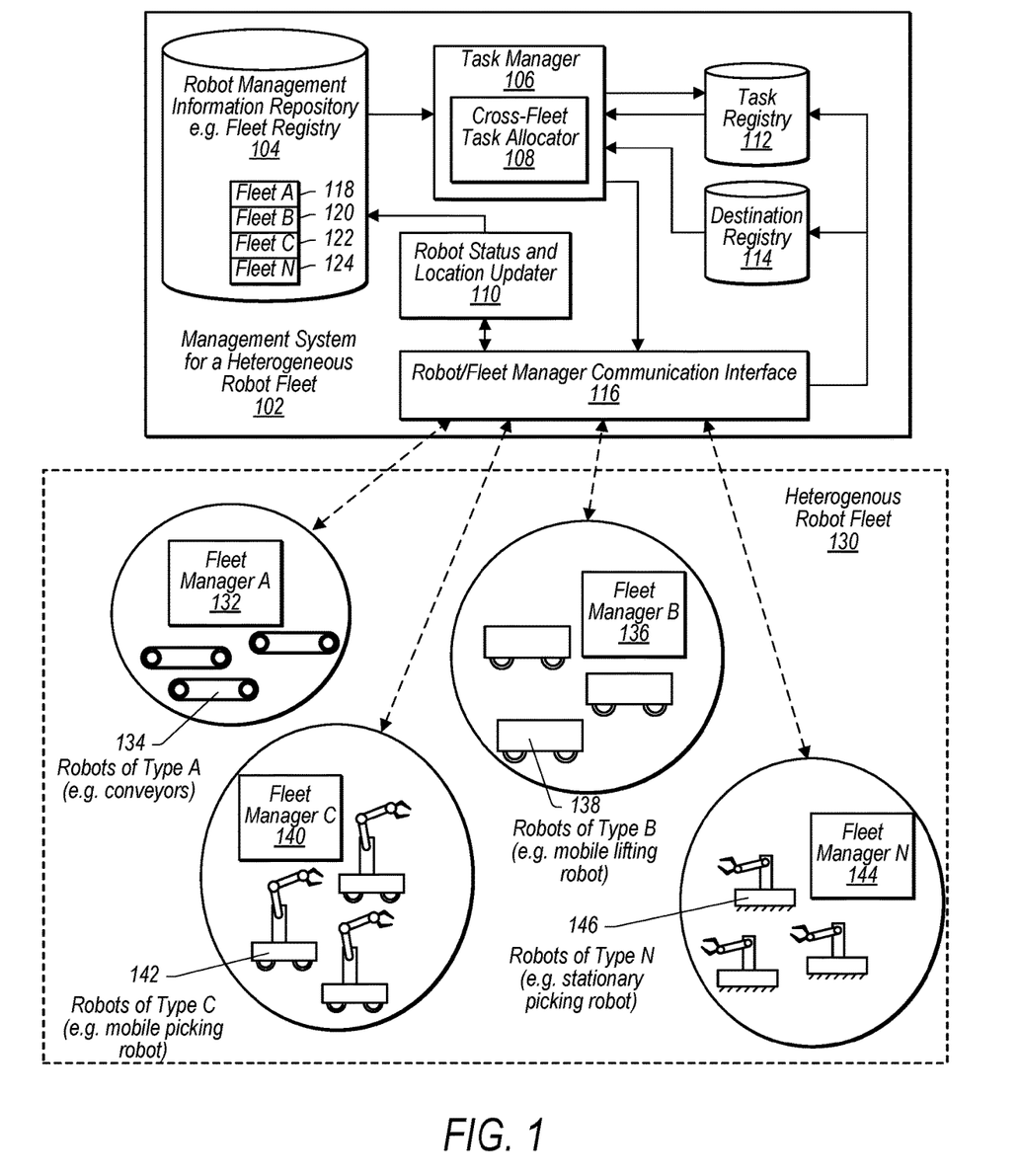
FIG. 1 illustrates a block diagram showing components of a management system for a heterogenous robot fleet along with robots and fleet managers of the heterogenous fleet, according to some embodiments.

In addition, in some embodiments, robot fleet communication manager 116 may provide updates to destination registry 114, such as a current capacity at a given destination to queue additional items, as an example. Also, robot fleet communication manager 116 may provide updates to task registry 112, such as indicate complete tasks or progress of on-going tasks. In some embodiments, an additional updater (similar to robot status and location updater 110) may be provided for updating one or both of task registry 112 and destination registry 114.

In some embodiments, developers, facility operators, etc. may build management applications on top of a management system for managing a heterogenous robot fleet. This may allow the management applications to interface with a single entity in order to manage robots across multiple heterogenous fleets. In some embodiments, a management system for managing a heterogenous robot fleet may provide standardized APIs that use standardized API calls. This standardization may simplify development of management applications because details of the specific robots and fleet managers is handled by the management system for managing a heterogenous robot fleet and abstracted away from the point of view of the management applications. Also, this may allow customers that operate multiple facilities with different robot fleets in each facility to develop common management applications for the multiple facilities, wherein the details concerning the varying types of robots are handled by respective management systems for managing heterogenous robot fleets, implemented at each of the facilities.

Also, in some embodiments, a management system for managing a heterogenous robot fleet may provide users with templates for common robot tasks, wherein the templates may be used to develop management applications. In some embodiments, such templates may be included in a software development library provided to customers as part of a management system for managing a heterogenous robot fleet. The software library may enable customers to build complex management applications that use aspects of the software library to perform common task orchestrations. For example, task implementations included in the software library may include built-in shared space management and collision avoidance functions.

In some embodiments, a management system for managing a heterogenous robot fleet further provides fleet data from the fleet registry to a machine learning service, such as may be implemented in a same service provider network with the management system for managing a heterogenous robot fleet. Also, task and destination data may additionally be provided to the machine learning service. The machine learning service may include trained models that have been trained with fleet registry data, task registry data, and/or destination registry data from the given facility and/or other facilities. The machine learning service may further provide updated control schemes to be used by a task manager to improve various aspects of fleet management for the heterogeneous robot fleets at the given facility.

In some embodiments, low-cost attachable sensors may further be included with a management system for managing a heterogenous robot fleet. The attachable sensors may be attached to non-automated entities operating in the facility, such as forklifts, manual tools, etc. The attachable sensors may provide additional status information to be used by the task manager in coordinating tasks. For example, robot traffic may be coordinated taking into account forklift traffic, as an example.

FIG. 1 illustrates a block diagram showing components of a management system for a heterogenous robot fleet along with robots and fleet managers of the heterogenous fleet, according to some embodiments.

In some embodiments, a management system for managing heterogenous robot fleets, such as management system for a heterogenous robot fleet 102, may manage a plurality of robot fleets comprising heterogenous types of robots, such as heterogenous robot fleet 130. For example, heterogenous robot fleet 130 includes robots 134 of type A (which may be, for example, conveyor systems at a facility) and which include their own fleet manager A 132. Also, heterogenous robot fleet 130 includes robots 138 of type B (which may be, for example, mobile lifting robots at the same facility as conveyer robots 134) and which include their own fleet manager B 136. Additionally, heterogenous robot fleet 130 includes robots 142 of type C (which may be, for example, mobile picking robots at the same facility as conveyer robots 134 and mobile lifting robots 138) and which include their own fleet manager C 140. Also, heterogenous robot fleet 130 includes robots 146 of type N (which may be, for example, mobile stationary picking robots at the same facility as conveyer robots 134, mobile lifting robots 138, and mobile picking robots 142) and which include their own fleet manager N 144. In some embodiments, a facility may include any number of robots, robot fleets, and/or fleet managers. In some embodiments, robot fleets may be defined by type of robot, as shown in FIG. 1, by robot manufacturer, robot model, or any combination thereof. In some embodiments, at least some robots of a heterogenous robot fleet, such as heterogenous robot fleet 130, may be directly controlled by management system for heterogenous robot fleets 102 without using a fleet manager.

In some embodiments, robots of fleets A through N of heterogenous robot fleet 130 may include automated guided vehicles (AGV), which can detect obstructions, but lack intelligence to negotiate avoiding an obstruction. For example, an AGV robot may follow an infrastructure map, such as a line drawn on a floor of a facility or a magnetic tracing on a floor of a facility. The AGV robots may be able to detect an obstruction in their path and in response to detecting the obstruction, stop. However, the AGV robots may lack the ability to deviate from the infrastructure map in order to avoid the obstruction. In some embodiments, the robots of fleets A through N of heterogenous robot fleet 130 may additionally, or alternatively, include autonomous mobile robots (AMR) which include intelligence to detect and avoid obstructions.

In some embodiments, a management system for a heterogenous robot fleet, such as management system for a heterogenous robot fleet 102, includes a robot management information repository, such as fleet registry 104, a destination registry, such as destination registry 114, a task registry, such as task registry 112, a task manager, such as task manager 106, a robot status and location updater, such as robot status and location updater 110, and a robot and/or fleet manager communication interface, such as robot/fleet manager communication interface 116.

Figure 4:
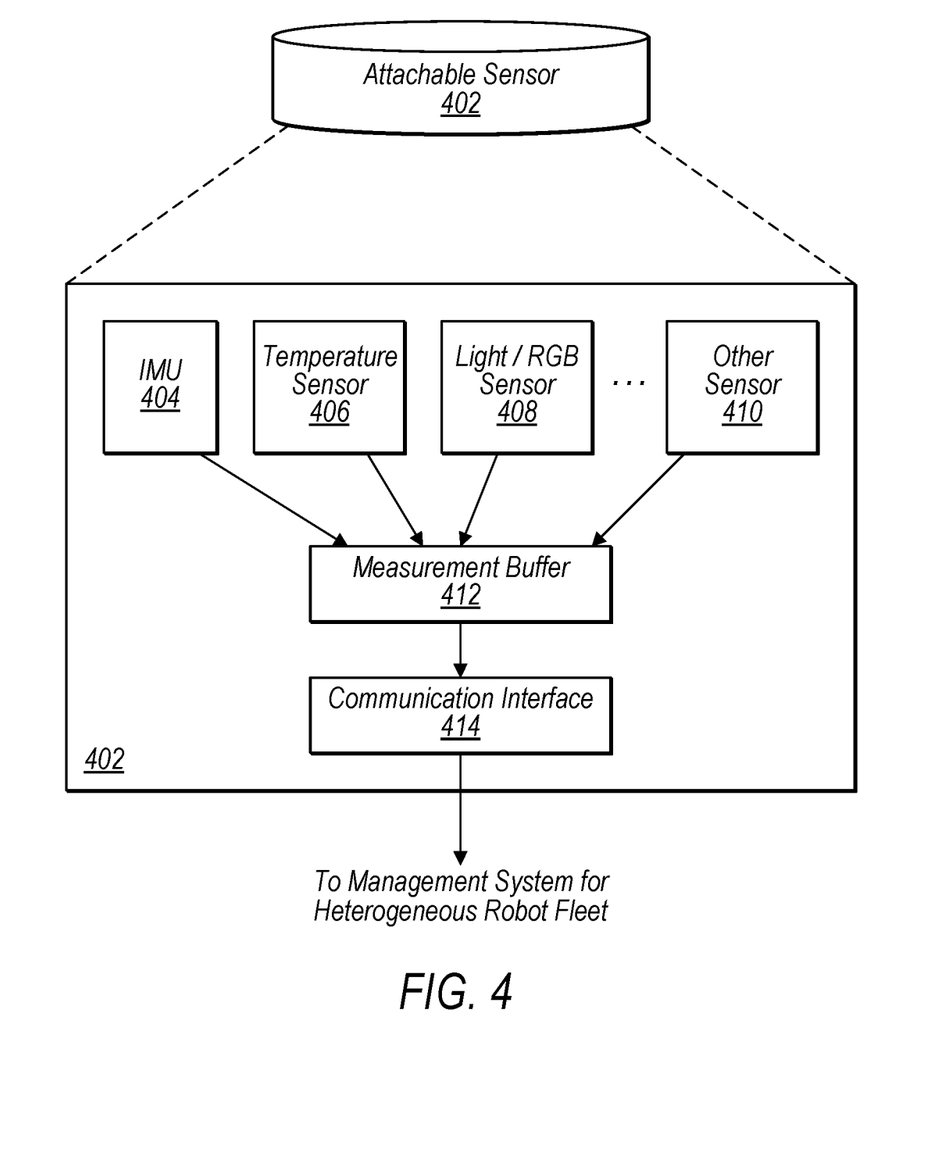
FIG. 4 illustrates an example attachable sensor that may be attached to a non-automated piece of equipment at a facility, and which may provide information about the non-automated piece of equipment to a management system for a heterogenous robot fleet, according to some embodiments.

In some embodiments, a robot management information repository, such as fleet registry 104, includes fleet status information for robot fleets managed by the management system 102. The robot fleet registry 104 may act as a unified repository for robot information for heterogenous types of robots. The unified repository may provide a centralized repository for the robot information of the various fleets, such of which comprising different types of robots. For example, fleet registry 104 includes status information 118, 120, 122, and 124 for fleets A, B, C, and N, respectively. For example, fleet registry 104 provides a unified view of robot data across multiple fleets, such as fleets A through N. While not shown, in some embodiments, fleet registry 104 may further include status information for manually operated equipment, wherein the status information is collected via attachable sensors, such as shown in FIG. 4. In addition to status information, fleet registry 104 may additionally store information for how to communicate and command robots of the respective fleets. For example, fleet registry 104 may store protocols for issuing commands to fleet managers 132, 136, 140, and/or 144 and/or protocols for directly communicating with robots 134, 138, 142, and/or 146. In some embodiments, robot fleet manager communication interface 116 may receive communication protocols for a given robot fleet from fleet registry 104, wherein the communication protocols are used by robot fleet manager communication interface 116 to issue commands to robots or robot fleet managers. Also, the communication protocols may be used to receive status information from the robots and/or fleet managers. In some embodiments, fleet registry 104 may further store information indicating available task commands that may be submitted to the robots or fleet managers, such as tasks that are supported by the different types of robots (e.g., task definitions). Also, in some embodiments, the fleet registry 104 may store information indicating capacities of the respective robots. For example, how long a robot can operate between charges, how much a robot can lift, etc. In some embodiments, capacity information may further include tasks a given robot is capable of performing (e.g., task definitions for respective robot types may be a component of the capacity information for the respective robot types).

In some embodiments, robot status and location updater 110 may update status information for the robots of fleets A through N that is stored in fleet registry 104. For example, robot battery charge, robot location, robot availability status, etc. may be updated in fleet registry 104 via robot status and location updater 110 using status information received via robot/fleet manager communication interface 116.

In some embodiments, task manager 106 may use robot status information from fleet registry 104, along with task definitions from fleet registry 104 for tasks that different robots of the heterogenous fleet are configured to perform to determine task assignments. In some embodiments, task manager 106 may include a cross-fleet task allocator 108 that assigns tasks to different fleets of robots of the larger heterogenous fleet. For example, task manager 106 may assign a task to a robot 138 to lift and move an item in a facility to a destination adjacent to a conveyor 134, the task manager 106 may further assign a task to a stationary picking robot 146 to move the item from the lifting robot 138 to the conveyor 134. Furthermore, the task manager 106 may assign another task to a mobile picking robot 142 to pick the item off of an opposite end of the conveyor 134 and place the item in a package for shipment, as an example. In some embodiments, as further discussed in FIG. 2, a task manager 106 may receive a request from an inventory management system of a facility to prepare an item for shipping and may allocate tasks across fleets, as described in the above example, to implement the request from the inventory management system.

In some embodiments, task registry 112, may store a queue of allocated but-not-yet-performed tasks. In some embodiments, a state of a queue for a given type of robot, along with robot status, location, etc. may be used as inputs by a task manager 106 when determining task allocations to be assigned to different types of robots of a heterogenous robot fleet to perform a particular job. In some embodiments, a job may be received via communication interface 116 and task manager 106 may determine individual robot tasks that need to be performed to execute the job. Task manager 106 may further add the tasks to the task registry 112 and pull tasks from the task registry for assignment to individual robots or robot fleet managers, such as robots 134, 138, 142, or 146 (or fleet managers 132, 136, 140, or 144).

In some embodiments, destination registry 114 stores one or more maps of a facility, wherein the maps include markings of destinations that robots may visit or locations where tasks may be performed. In some embodiments, such mappings may be stored in various formats, such as in a tabular format, a graphical format, a database format, etc. In some embodiments, path intersections or other shared space information may be stored in the destination registry and robots, a task manager, and/or fleet manager may query management system 102 to perform path conflict resolution, as further described in FIG. 3.

Figure 2:
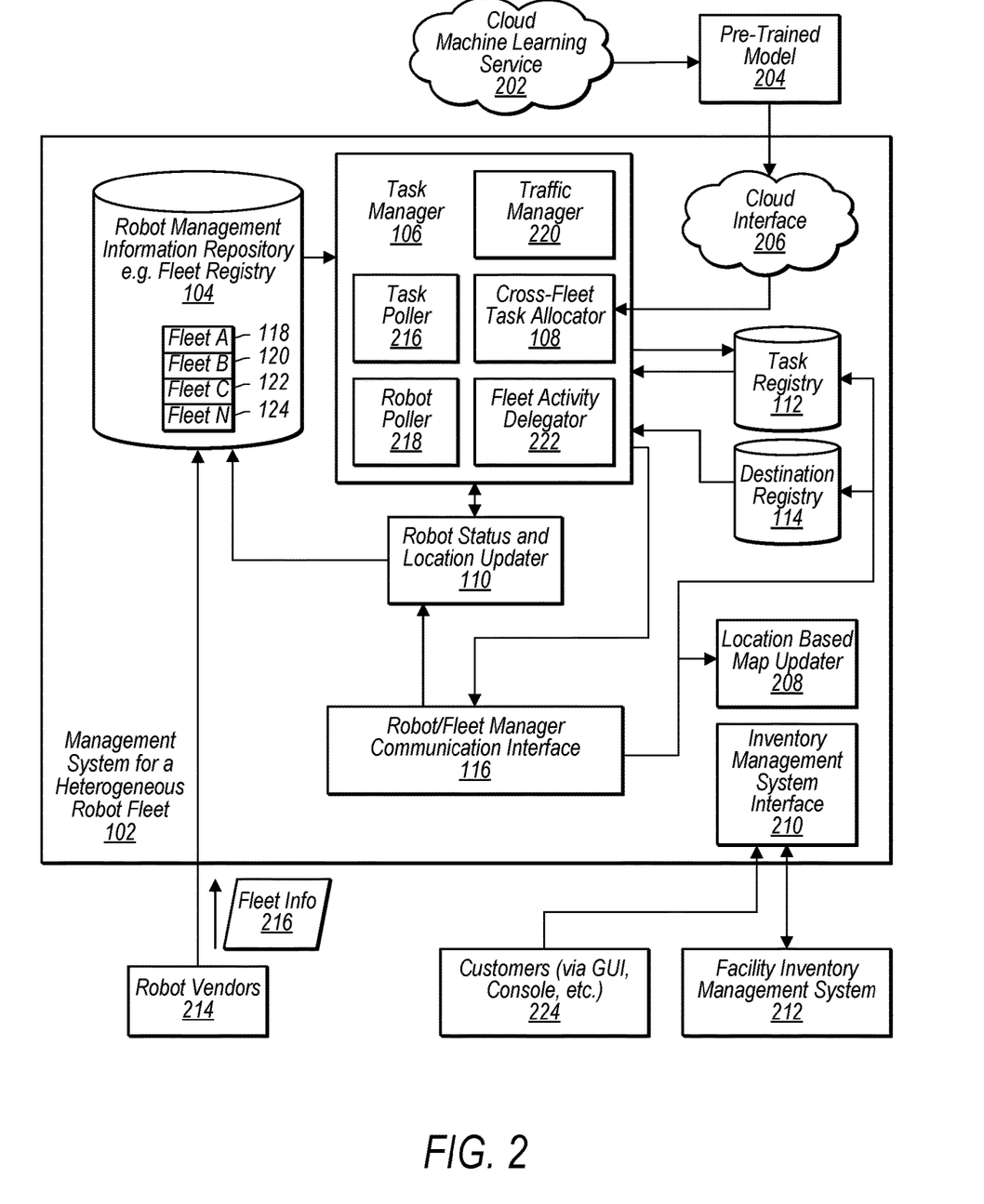
FIG. 2 illustrates additional components that may be included in a management system for a heterogenous robot fleet, as well as interactions between the management system for a heterogenous robot fleet and robot vendors and a facility inventory management system, according to some embodiments.

FIG. 2 illustrates additional components that may be included in a management system for a heterogenous robot fleet, as well as interactions between the management system for a heterogenous robot fleet and robot vendors and a facility inventory management system, according to some embodiments.

In some embodiments, a management system for a heterogenous robot fleet 102 may initially be populated with fleet information for a plurality of robot types offered by a plurality of robot vendors. Also, the management system for a heterogenous robot fleet 102 may additionally be updated with updated or additional robot fleet information 216 from robot vendors 214. For example, the management system for a heterogenous robot fleet 102 may be provided to customer pre-populated with fleet information for a plurality of robot types. Also, the customer, and/or robot vendors, may further add additional fleet information or update already stored fleet information.

Also, as described above, in some embodiments, a management system for a heterogenous robot fleet 102 may be integrated with an inventory management system. For example, more complex inventory management applications may be developed that make API calls to a management system for a heterogenous robot fleet 102 in order to effectuate inventory movements. For example, in some embodiments, management system for a heterogenous robot fleet 102 may further include inventory management system interface 210 that provides a standardized API interface to facility inventory management systems 212. Also, in some embodiments, customers 224, such as a manager at a facility, a technician at a facility, etc., may cause similar API calls to be submitted to inventory management system interface 210, using a user interface, such as a graphical user interface, console, command line interface, etc. Also, in some embodiments, management system for a heterogenous robot fleet 102 may include a location-based map updater 208. For example, in some embodiments, robots of a fleet may capture information about a facility, which may be used to update one or more maps (and/or other information) stored in destination registry 114. In some embodiments, inventory management system interface 210 may use standardized API calls and be configured to communicate with various different types of facility inventory management systems 212.

In some embodiments, a management system for a heterogenous robot fleet 102 includes cloud interface 206 which may provide an interface to communicate, via a network connection with a cloud computing service, which may include cloud machine learning service 202. The cloud machine learning service 202 may provide a pre-trained model 204 or updates to a previously provided models 204. The pre-trained model may have been trained based on training data collected from other facilities with similar types of robots. Also, in some embodiments, cloud machine learning service 202 may apply machine learning techniques to develop or update a control model specific to a facility in which heterogenous robot fleet 130 operates. Also, in some embodiments, cloud machine learning service 202 may monitor performance of management system for a heterogenous fleet 102 and provide recommendations to a facility operator, such as recommendations to improve sub-optimal equipment utilization, recommendations regarding equipment malfunctions, recommendations regarding workflow bottlenecks, etc. In some embodiments, example machine learning models that may be provided by cloud machine learning service 202 include a task orchestration model and/or a space reservation/allocation and collision avoidance model.

In some embodiments, task manager 106 of management system for a heterogenous robot fleet 102, may further include task poller 216, which may poll facility inventory management system 212 for tasks to be performed, or may poll machine learning model 204 for tasks to be performed. Likewise, task manager 106 may include robot poller 218 which may poll robots (or robot fleet managers) for updates regarding completion of tasks. In some embodiments, fleet activity delegator 222 may delegate tasks from task registry 112 based on robot status as determined from fleet registry 104 and/or based on completion of tasks as indicated in response to robot polls performed by robot poller 218. As further discussed in FIG. 3, in some embodiments, task manager 106 may further include a traffic manager 220 to assist robots to navigate path intersections or other shared spaces.

Figure 3:
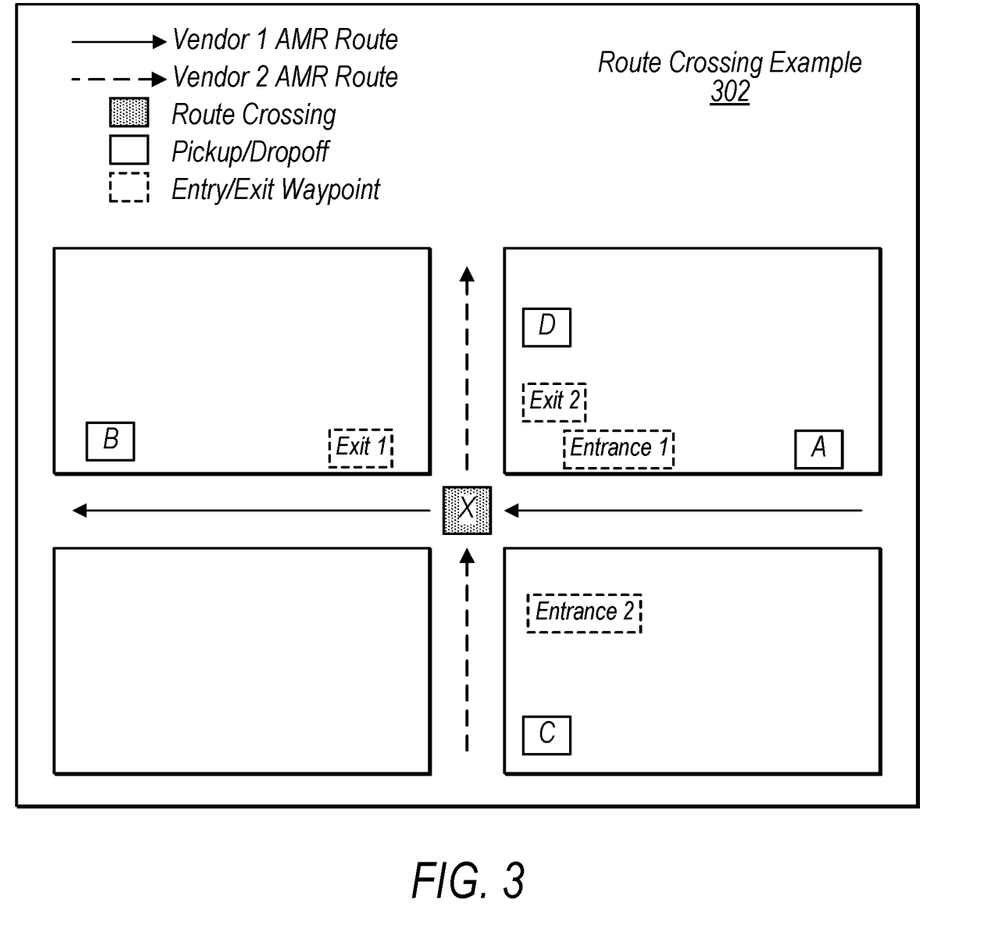
FIG. 3 illustrates an example shared space and further illustrates entries and exits to the shared space, wherein a management system for a heterogenous robot fleet controls access to the shared space to avoid congestion and/or robot collisions, according to some embodiments.

FIG. 3 illustrates an example shared space and further illustrates entries and exits to the shared space, wherein a management system for a heterogenous robot fleet controls access to the shared space to avoid congestion and/or robot collisions, according to some embodiments. However, it should be noted that similar techniques may be performed by a traffic manager to manage access to other shared spaces, such as a dead-end corridor, drop-off location, or other space where robots must share a limited space.

In some embodiments, destination registry 114 stores shared space locations, such as the route crossing shown in route crossing example 302 where the path from point A to point B crosses the path from point C to point D. The destination registry 114 may further store entry point information and exit point information, such as entrance 1 along the path from point A to point B at the route crossing and such as entrance 2 along the path form point C to point D at the route crossing. Additionally, the destination registry 114 may store exit point information, such as exit 1 along the path from point A to point B and the exit 2 along the path from point C to point D. Robots travelling along either path may be configured to request authorization from traffic manager 220 upon reaching an entrance (or in anticipation of reaching an entrance) to a route crossing location, such as entrance 1 or entrance 2. In response to receiving a request for entry, the traffic manager 220 may determine whether a total number of robots that have been admitted to the route crossing (e.g., intersection) is less than a threshold amount that has been determined acceptable to avoid collisions. In response to determining a total number of robots that have entered but not yet exited the given path intersection is greater than a threshold amount the traffic manager refrains from providing authorization to a given robot to enter the given path intersection. However, in response to determining a total number of robots that have been authorized to enter but have not yet exited the given path intersection is less than the threshold amount the traffic manager provides authorization to the given robot to enter the given path intersection. Also, upon reaching exit point 1 or exit point 2 (depending upon which path is being traveled), the given robot that was admitted to enter the intersection provides an indication to the traffic manager 220 that it has exited the intersection. In some embodiments, instead of providing an explicit indication, an indication can be inferred for the given robot, for example based on a current location of the given robot that is beyond the intersection. In response, the traffic manager updates a count of robots that have entered but not yet exited the given path intersection and admits or denies entry to other robots based on the updated count.

In some embodiments, a traffic manager, such as traffic manager 220, may provide one or more application programmatic interfaces for managing traffic, such as:

List<TrafficLimitZoneId, List<RobotAtTrafficLimitZone>>listRobotsWaiting AtTrafficLimitZones( )—This API may provide a list of robots waiting to be cleared for entering traffic limited zones in the facility and associated meta-data (robot id, mobile mission id, arrival time, etc. with a waiting robot). The meta-data may enable customers to prioritize robots based on their business needs e.g., FIFO, task priority, etc.

clearRobotsToEnterTrafficLimitZones(List<ZoneId,RobotId>)—This API lists of robots that are cleared for entering/occupying corresponding traffic limited zones.

List<ZoneId, RobotId>listRobotsOccupyingTrafficLimitZones( )—This API provides a list of robots currently within traffic control zones. The traffic manager will query this information to determine if other robots can be cleared to occupy the corresponding traffic limited zone.

List<TrafficLimitZone>listTrafficLimitZones( ): This API provides a list of currently configured traffic limited zones of a facility and associated meta-data e.g. name, boundary polygon. This can be used to periodically verify the configuration of the traffic manager and the robot fleet managers and surface any discrepancies e.g., accidental deletion, etc.

configureHeterogeneousTrafficLimitZone(ZoneId, ZoneInfo)—This API enables a customer to configure a traffic limit zone to align with the customer specification via the traffic manager. This helps customers to set up traffic limited zoned directly with the traffic manager rather than having to configure traffic limited zones individually in the different robot fleet managers.

updateHeterogeneousTrafficLimitZone(ZoneId, ZoneInfo)—This API allows a customer to update the configuration e.g. name, boundary of a traffic limited zone. Because this can be disruptive to the operation of the facility, this may be supported only as an operational tool/action from the customer and not for frequent dynamic updates.

deleteHeterogeneousTrafficLimitZone(ZoneId)—This API allows a customer to delete a traffic limited zone if it is no longer required. Because this can be disruptive to the operation of the facility, this may be supported as an operational tool/action from the customer.

FIG. 4 illustrates an example attachable sensor that may be attached to a non-automated piece of equipment at a facility, and which may provide information about the non-automated piece of equipment to a management system for a heterogenous robot fleet, according to some embodiments.

In some embodiments, a management system for a heterogenous fleet 102 may further collect information about non-robot articles in a facility using attachable sensors, such as attachable sensor 402. In some embodiments, an attachable sensor 402 may be attached to a tool, such as a forklift, pallet mover, lift, etc. The attachable sensor 402 may provide information about the location of the tool and what is in the surrounding area of the tool. For example, in some embodiments, attachable sensor 402 includes an inertial measurement unit 404 (which may include a GPS device, gyroscopes, accelerometers, etc.). Also, attachable sensor 402 may include temperature sensor 406, light/RGB sensor 408 (which may include a camera, infrared sensor, LiDar sensor, etc.). Also, attachable sensor 402 may include other sensors 410 such as a sound sensor, vibration sensor, etc. Measurement data collected from sensors 404 through 410 may be stored to measurement buffer 412 and may be provided to a management system for managing a heterogenous robot fleet 102 using communication interface 414. In some embodiments, collected information may be buffered and only uploaded in response to a request for information or other triggering event.

Figure 5A:
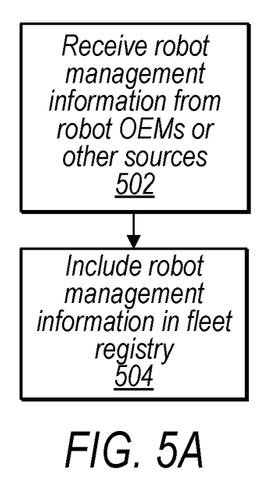
FIGS. 5A-5C illustrate information being provided to a management system for a heterogenous robot fleet to populate a fleet registry, a task registry, and a destination registry of the management system for the heterogenous robot fleet, according to some embodiments.
Figure 5B:
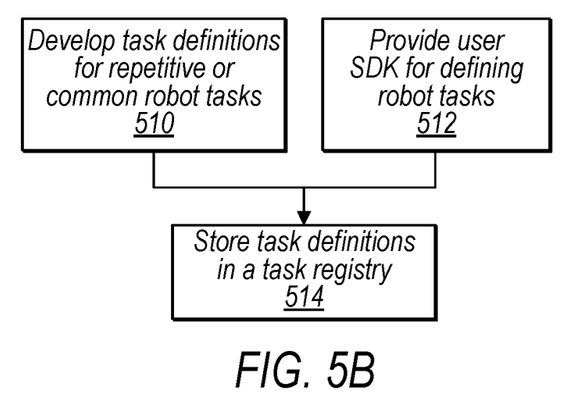
Figure 5C:
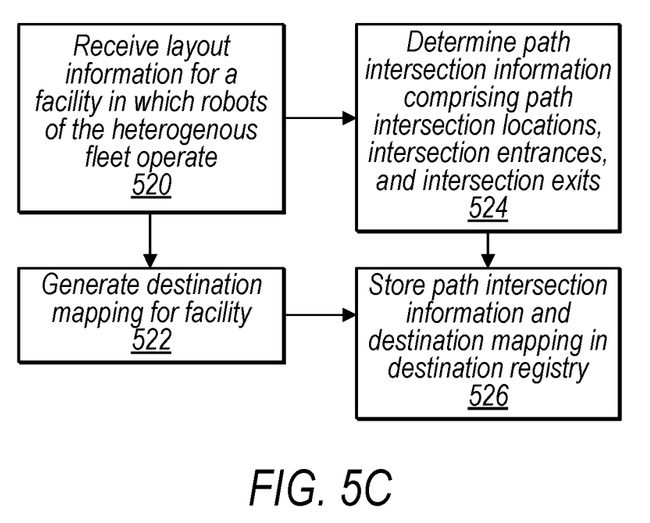

FIGS. 5A-5C illustrate information being provided to a management system for a heterogenous robot fleet to populate a fleet registry, a task registry, and a destination registry of the management system for the heterogenous robot fleet, according to some embodiments.

At block 502, a management system for a heterogenous robot fleet, such as management system for managing a heterogenous robot fleet 102, receives management information from robot OEMs or other sources. At block 504, the management system for a heterogenous robot fleet includes the robot management information in a fleet registry, such as fleet registry 104. In some embodiments, a management system for a heterogenous robot fleet may be provided with a pre-populated fleet registry 104 and updates may be provided as shown in FIG. 5A. Alternatively a fleet registry may be populated from an empty state using a process as shown in FIG. 5A.

At block 510, a cloud service or designer for a management system for a heterogenous robot fleet, such as management system for managing a heterogenous robot fleet 102, develops task definitions for repetitive or common robot tasks. For example, the example described above wherein a robot 138 lifts and moves an item in a facility to a destination adjacent to a conveyor 134, a stationary picking robot 146 moves the item from the lifting robot 138 to the conveyor 134, a mobile picking robot 142 picks the item off of an opposite end of the conveyor 134 and places the item in a package for shipment, may be a common or repetitive task. In some embodiments, a cloud service or designer may identify the repetitive task to be a task commonly performed at facilities with mobile lifting robots, mobile picking robots, conveyors, and stationary picking robots. Thus, the designer or cloud service may develop task definitions for a job of preparing an item for shipment that includes the tasks in the above example. The task definitions for the job may be developed based on task histories at other facilities with similar types of robots. Thus, upon installation at a new facility, the management system for managing heterogenous robots 102 may be pre-configured to orchestrate common tasks across various types of robot fleets. Also, in a similar manner at block 512, a heterogenous robot management system 102 may provide a user a software development kit (SDK) for designing jobs comprising a plurality of tasks. At block 514, the jobs and corresponding task definitions may be stored in a task registry and/or a fleet registry and may be used by a cross-fleet activity allocator and/or fleet activity delegator.

At block 520, a management system for a heterogenous robot fleet 102 receives layout information for a facility in which robots of the heterogenous fleet operate. At block 522, the management system for a heterogenous robot fleet 102 generates, based on the revised layout, a destination mapping for the facility. Also, at block 524, the management system for a heterogenous robot fleet 102 determines path intersection information or other shared space information for the facility. At block 526, the management system for a heterogenous robot fleet 102 stores the destination information and the path intersection information/shared space information in a destination registry, such as destination registry 114.

Figure 6:
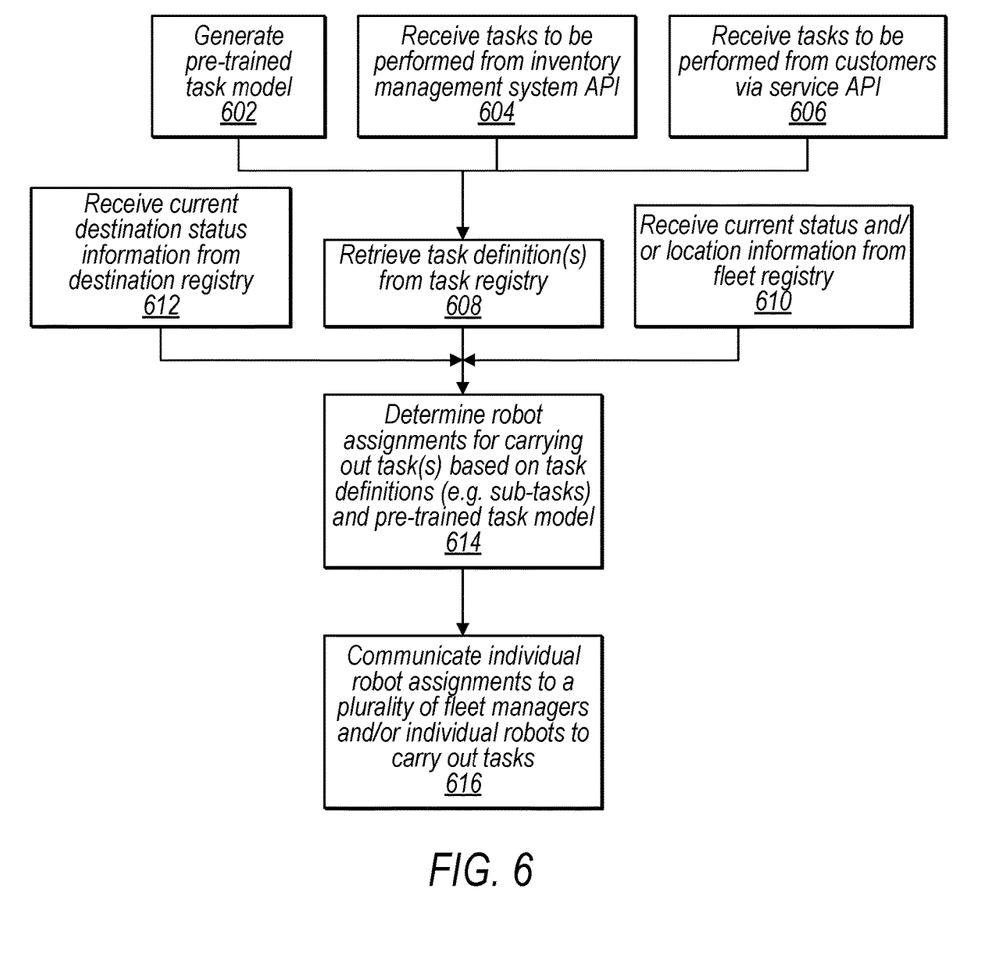
FIG. 6 illustrates a process for orchestrating assignment of tasks received from various sources to robots of a heterogenous robot fleet, according to some embodiments.

FIG. 6 illustrates a process for orchestrating assignment of tasks received from various sources to robots of a heterogenous robot fleet, according to some embodiments.

At block 602 pre-trained task models are developed. Also, at block 604, tasks to be performed are received from an inventory management system API. Additionally, at block 606, tasks to be performed are received from customers via a service API. At block 608, a task manager, such as task manager 106, receives task definitions from a task registry and at block 610 receives current status information from a fleet registry. Also, at block 610, the task manager may receive information indicating locations of respective ones of the robots in the facility. Additionally, at block 612, the task manager may receive status information about the respective destinations at which the robots are to perform a task. At block 614, the task manager determines robot (or fleet) assignments for carrying out tasks based on the task definitions and received tasks (received at blocks 602-606). Also, the task assignments may further be determined based on locations of available robots to perform the tasks relative to locations at which the tasks are to be performed. At block 616, the task manager communicates via communication interface 116 individual robot (or fleet) assignments to a plurality of fleet managers of the heterogenous fleet.

Figure 7:
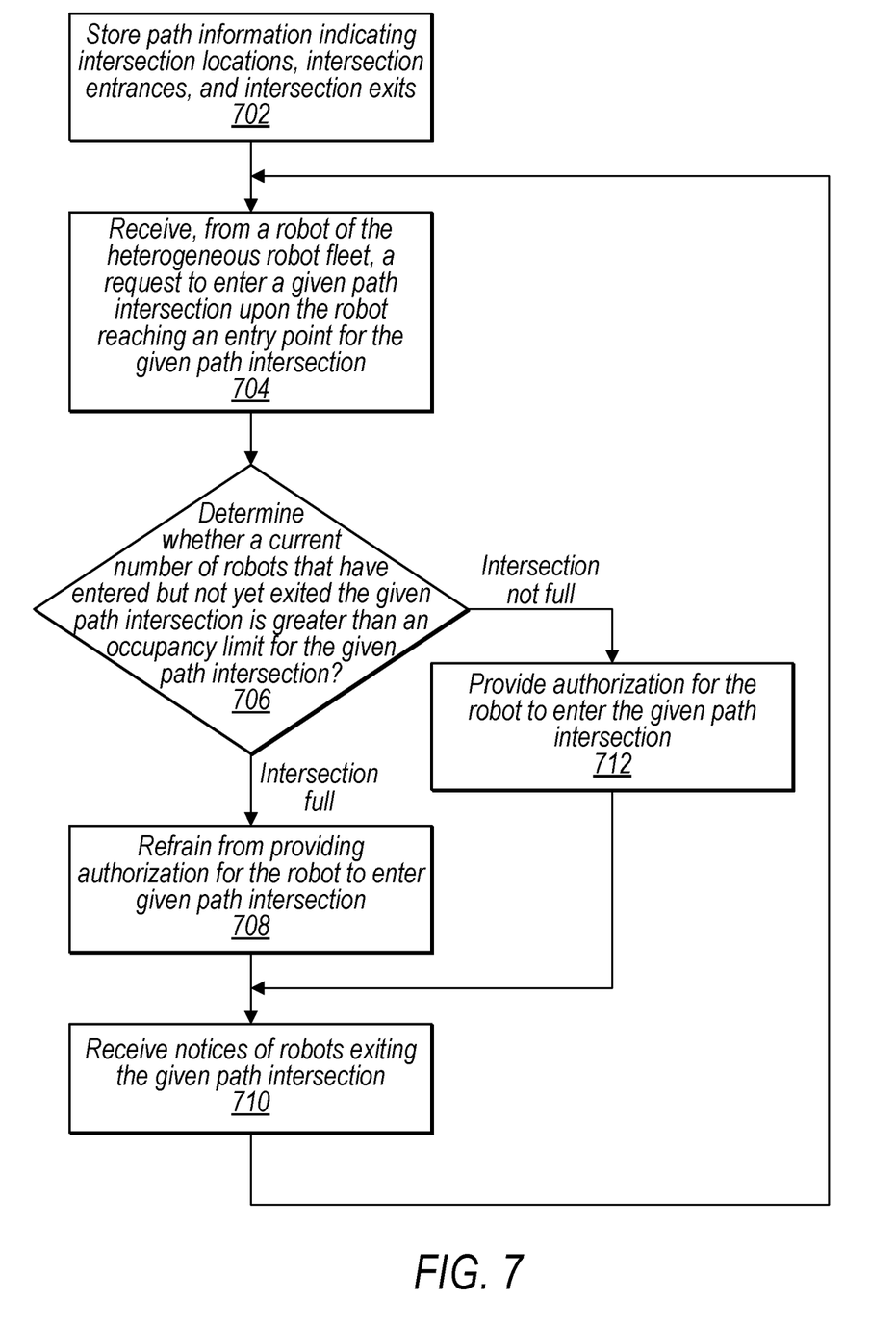
FIG. 7 illustrates a process for managing a path intersection or other shared space to avoid congestion and/or robot collisions, according to some embodiments.

FIG. 7 illustrates a process for managing shared space to avoid congestion and/or robot collisions, according to some embodiments.

At block 702, a destination registry, such as destination registry 114, stores path information indicating intersection locations, intersection entrances, and intersection exits. At block 704, a traffic manager, such as traffic manager 220, receives from a robot of the heterogeneous robot fleet (or from a fleet manager of a robot of the heterogenous robot fleet), a request to enter a given shared space upon the robot reaching an entry point for the given shared space. At block 706, the traffic manager 220 determines whether a current number of robots that have entered but not yet exited the given shared space is greater than an occupancy limit for the given shared space. If the intersection is not full, the traffic manager, at block 712, provides authorization for the robot to enter the given shared space. However, if the intersection is full, at block 708, the traffic manager 220 refrains from providing authorization for the given robot to enter given shared space. Then, at block 710, the traffic manger, receives notices of robots exiting the given shared space, and updates a count of robots in the intersection. This updated count is then used to determine if other robots can enter the intersection.

In some embodiments, if more than one robot is waiting to enter a shared space, such as a path intersection, the waiting robots may be given respective priorities for entering the shared space. In some embodiments, priorities may be based on which robot reached the shared space first, which robot is performing a higher priority task, battery level of a robot, etc.

Figure 8:
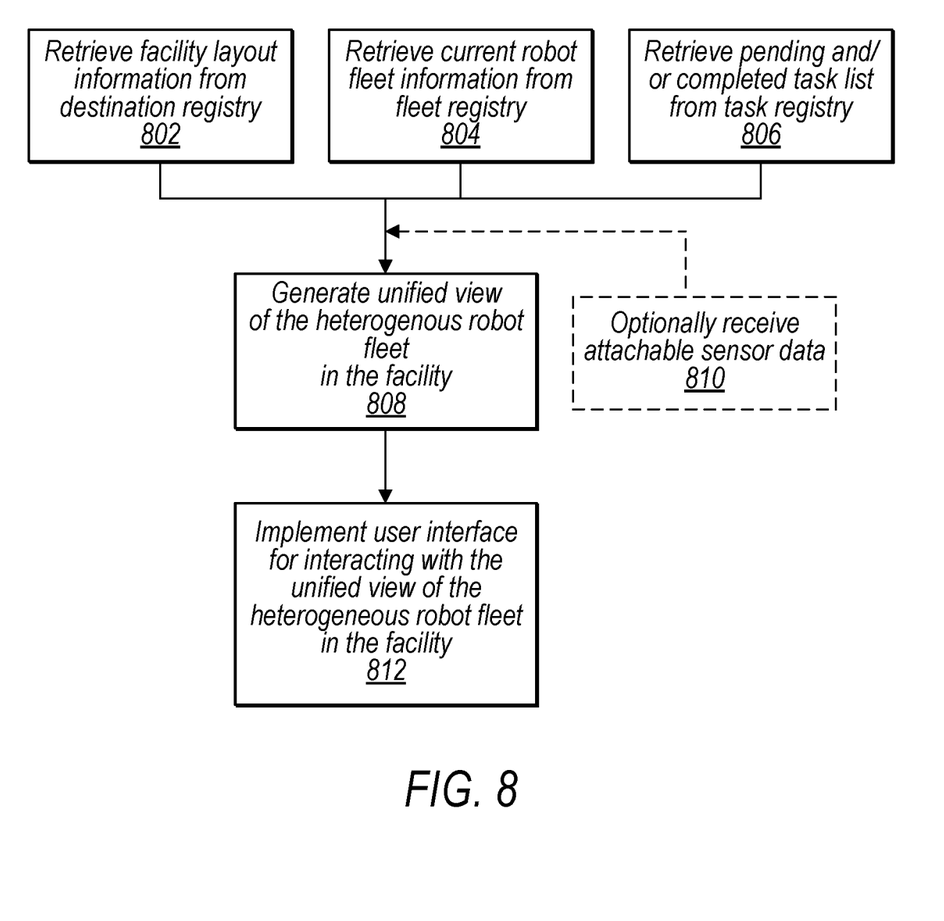
FIG. 8 illustrates an example processing for generating a unified view of a facility in which robots of a heterogenous robot fleet operate, according to some embodiments.

FIG. 8 illustrates an example processing for generating a unified view of a facility in which robots of a heterogenous robot fleet operate, according to some embodiments.

At block 802, a robot fleet manager communication interface that provides facility overview information to users retrieves facility layout information from a destination registry, such as destination registry 114. Also, at block 804, the communication interface retrieves current robot fleet information from a fleet registry, such as fleet registry 104. Additionally, at block 806, the communication interface retrieves pending and/or completed task information from a task registry, such as task registry 112. Optionally, the communication interface also receives sensor data from attachable sensors at block 810.

At block 808, the communication interface generates a unified view of the heterogenous robot fleet using the information retrieved or received at blocks 802, 804, 806, and 810. At block 812, the communication interface then implements a user interface for interacting with the unified view of the heterogenous robot fleet in the facility.

Example Computing System

Figure 9:
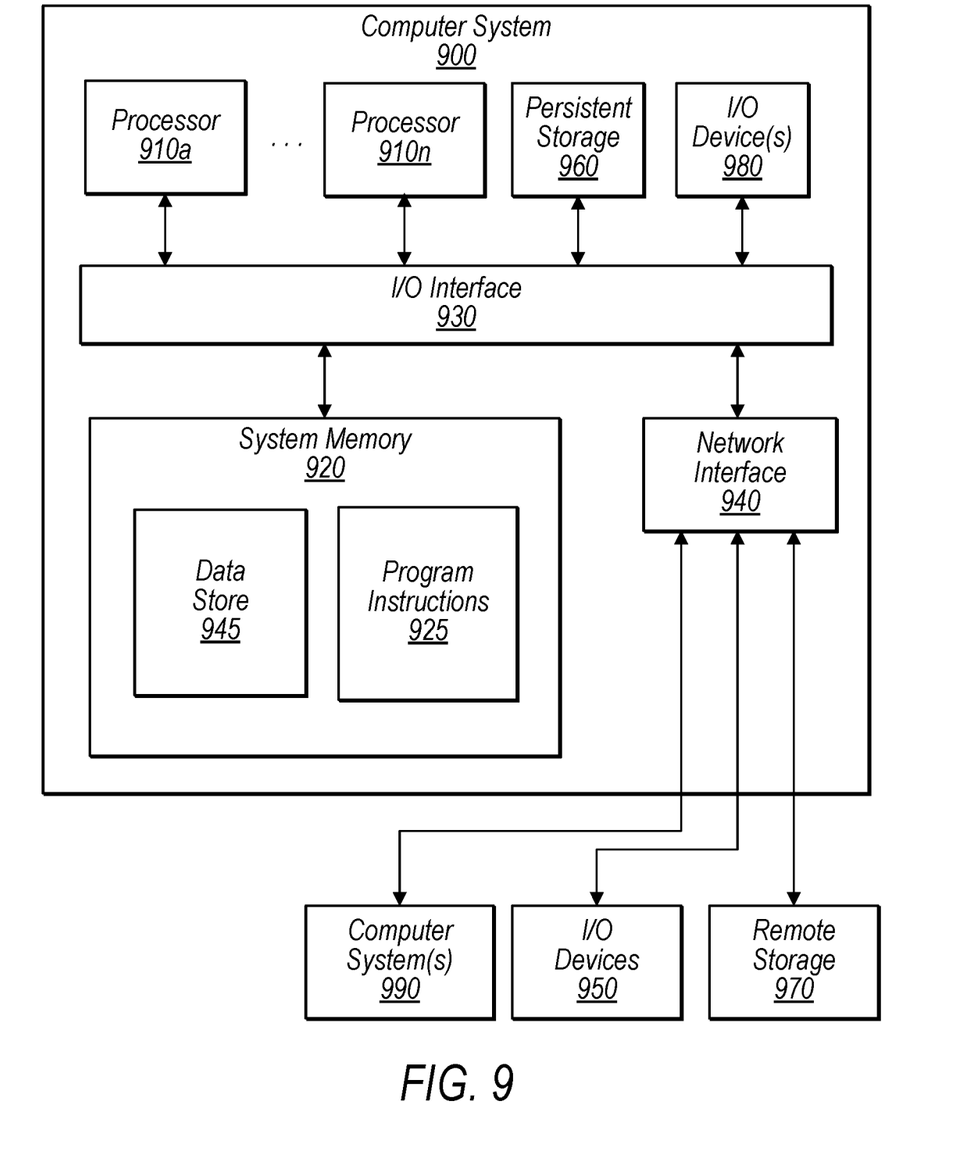
FIG. 9 is a block diagram illustrating an example computing system which may be used to implement a management system for a heterogenous robot fleet, according to some embodiments.

FIG. 9 is a block diagram illustrating an example computing system which may be used to implement a management system for a heterogenous robot fleet, according to some embodiments.

For example, computer system 900 may be configured to implement storage and/or compute nodes of a service of a provider network, a heterogenous robot fleet manager, a user interface, an API and/or a client, in different embodiments. Computer system 900 may be any of various types of devices, including, but not limited to, a personal computer system, desktop computer, laptop or notebook computer, mainframe computer system, handheld computer, workstation, network computer, a consumer device, application server, storage device, or in general any type of computing device.

Computer system 900 includes one or more processors 910 (any of which may include multiple cores, which may be single or multi-threaded) coupled to a system memory 920 via an input/output (I/O) interface 930. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. The computer system 900 also includes one or more network communication devices (e.g., network interface 940) for communicating with other systems and/or components over a communications network (e.g., Internet, LAN, etc.).

In the illustrated embodiment, computer system 900 also includes one or more persistent storage devices 960 and/or one or more I/O devices 980. In various embodiments, persistent storage devices 960 may correspond to disk drives, tape drives, solid state memory, other mass storage devices, block-based storage devices, or any other persistent storage device. Computer system 900 (or a distributed application or operating system operating thereon) may store instructions and/or data in persistent storage devices 960, as desired, and may retrieve the stored instruction and/or data as needed. For example, in some embodiments, computer system 900 may host a storage system server node, and persistent storage 960 may include the SSDs attached to that server node.

Computer system 900 includes one or more system memories 920 that are configured to store instructions and data accessible by processor(s) 910. In various embodiments, system memories 920 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 920 may contain program instructions 925 that are executable by processor(s) 910 to implement the methods and techniques described herein. In various embodiments, program instructions 925 may be encoded in platform native binary, any interpreted language such as Java™ byte-code, or in any other language such as C/C++, Java™, etc., or in any combination thereof. For example, in the illustrated embodiment, program instructions 925 include program instructions executable to implement the functionality of a heterogenous robot fleet manager, in different embodiments. In some embodiments, program instructions 925 may implement multiple separate clients, nodes, and/or other components of a heterogenous robot fleet manager.

In some embodiments, program instructions 925 may include instructions executable to implement an operating system (not shown), which may be any of various operating systems, such as UNIX, LINUX, Solaris™, MacOS™, Windows™, etc. Any or all of program instructions 925 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 900 via I/O interface 930. A non-transitory computer-readable storage medium may also include any volatile or non-volatile media such as RAM (e.g., SDRAM, DDR SDRAM, RDRAM, SRAM, etc.), ROM, etc., that may be included in some embodiments of computer system 900 as system memory 920 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 940.

In some embodiments, system memory 920 may include data store 945, which may be configured as described herein. In general, system memory 920 (e.g., data store 945 within system memory 920), persistent storage 960, and/or remote storage 970 may store data blocks, replicas of data blocks, metadata associated with data blocks and/or their state, configuration information, and/or any other information usable in implementing the methods and techniques described herein.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as other computer systems 990, for example as may be included in robots or robot fleet managers. In addition, network interface 940 may be configured to allow communication between computer system 900 and various I/O devices 950 and/or remote storage 970. Input/output devices 950 may, in some embodiments, include one or more display terminals, keyboards, keypads, touchpads, scanning devices, voice or optical recognition devices, or any other devices suitable for entering or retrieving data by one or more computer systems 900. Multiple input/output devices 950 may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol. In various embodiments, computer system 900 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system for managing robots of a heterogenous robot fleet, the system comprising one or more computing devices configured to implement:

a unified repository storing:

respective sets of robot management information for different types of robots and/or robots manufactured by different manufacturers;

one or more robot communication interfaces configured to:

provide instructions to the robots, or fleet managers of the robots, wherein the instructions are formatted using respective communication protocols of the robots or the fleet managers determined based on the respective sets of robot management information stored in the unified repository; and a task manager configured to:

receive status information about the robots of the heterogenous robot fleet;

determine, based on the received status information, tasks to be completed by respective ones of the robots of the heterogenous robot fleet; and cause the one or more robot communication interfaces to provide the instructions formatted using the respective communication protocols to the respective ones of the robots, or the fleet managers for the respective ones of the robots, to assign the determined tasks to the robots of the heterogenous robot fleet.

2. The system of claim 1, wherein the one or more computing devices are further configured to implement:

a fleet registry comprising:

capacity information for the different types of robots and/or robots manufactured by different manufacturers included in the heterogenous fleet;

status information for the different types of robots and/or robots manufactured by different manufacturers included in the heterogenous fleet; and location information for the different types of robots and/or robots manufactured by different manufacturers included in the heterogenous fleet.

3. The system of claim 2, wherein the one or more computing devices are further configured to implement:

a task registry comprising:

a centralized listing of yet-to-be performed tasks that have been assigned to the robots or robot fleets of the heterogenous robot fleet, wherein the task manager further determines the tasks to be completed by the respective ones of the robots or the robot fleets of the heterogenous robot fleet based on respective workloads of the robots or the robot fleets as indicated in the task registry.

4. The system of claim 3, wherein the one or more computing devices are further configured to implement:
a destination registry comprising:
a mapping of destinations in one or more facilities in which the robots of the heterogenous robot fleet operate,
wherein the task manager further determines the tasks to be completed by the respective ones of the robots of the heterogenous robot fleet based on:
relative distances between locations of the robots and destinations in the one or more facilities where respective ones of the tasks are to be performed; and/or
respective capacities of the destinations in the one or more facilities to accommodate the robots or completion of the tasks.

5. The system of claim 4, wherein the destination registry, further comprises:
shared space locations for one or more paths in the one or more facilities in which the robots of the heterogenous robot fleet operate;
entry point information for the respective shared space locations; and
exit point information for the respective shared space locations,
wherein the robots or fleet managers are configured to:
request authorization from the task manager to enter a given shared space prior to or upon reaching an entry point for the given shared space; and
indicate to the task manager an exit from the given shared space upon reaching an exit point for the given shared space,
wherein the task manager is further configured to:
receive a request to enter the given shared space from a given one of the robots upon the given robot reaching the entry point for the given shared space;
in response to determining a total number of robots that have entered but not yet exited the given shared space is greater than a threshold amount, refrain from providing authorization to the given robot to enter the given shared space; and
in response to determining a total number of robots that have entered but not yet exited the given shared space is less than the threshold amount, provide authorization to the given robot to enter the given shared space.

6. The system of claim 5, wherein the one or more computing devices are further configured to implement:
a set of application programmatic interfaces (APIs), configured to receive instructions from one or more inventory management systems of the one or more facilities in which the robots of the heterogenous robot fleet operate,
wherein tasks received via the set of APIs are added to a queue of tasks to be assigned by the task manager.

7. The system of claim 6, wherein the APIs are configured to receive the instructions in a format used by the one or more inventory management systems of the one or more facilities in which the robots of the heterogenous robot fleet operate.

8. A method of managing robots of a heterogenous robot fleet, the method comprising:
storing, in a centralized repository, respective sets of robot management information for different types of robots and/or robots manufactured by different manufacturers that use different robot interfaces; and
providing instructions to the robots formatted using respective communication protocols in accordance with the respective sets of robot management information stored in the centralized repository, wherein the instructions assign tasks to the robots of the heterogenous robot fleet.

9. The method of claim 8, further comprising:
receiving tasks assignments for robots of different types or manufactured by different manufacturers, via an application programmatic interface (API) of a heterogenous robot fleet management system, wherein the task assignments are formatted in accordance with a common format of the API; and
providing said instructions to the robots based on the received task assignments.

10. The method of claim 9, further comprising:
storing task definitions for the task assignments in a task repository, wherein for at least some of the task assignments that conform to the common format of the API, the at least some tasks comprise a plurality of sub-tasks to be performed by a set of the robots of the heterogenous fleet,
wherein said providing instructions to the robots comprises providing instructions to the set of robots to perform the plurality of sub-tasks of the task assignment received via the API.

11. The method of claim 8, further comprising:
determining tasks to be performed by the robots or robot fleets of the heterogenous fleet based on received status information for the robots or the robot fleets.

12. The method of claim 11, wherein said determining the tasks is performed using a pre-trained machine learning model that has been trained using training data for the robots of different types or manufactured by different manufacturers.

13. The method of claim 8, further comprising:
receiving sensor data from the robots of the heterogenous robot fleet; and
storing the sensor data in a centralized facility information repository for one or more facilities in which the robots of the heterogenous robot fleet operate.

14. The method of claim 13, further comprising:
receiving sensor data from attachable sensors attached to non-robot entities operating in the one or more facilities in which the robots of the heterogenous fleet operate; and
storing the sensor data from the attachable sensors in the centralized facility information repository for the one or more facilities in which the robots of the heterogenous robot fleet operate.

15. The method of claim 8, further comprising:
storing path information comprising:
shared space locations for one or more paths in one or more facilities in which the robots of the heterogenous robot fleet operate;
entry point information for the respective shared space locations; and
exit point information for the respective shared space locations,
receiving an indication that a given one of the robots is to enter a shared space upon, or prior to, the given robot reaching an entry point for the given shared space;
responsive to determining a total number of robots that have entered but not yet exited the given shared space is greater than a threshold amount, refraining from providing authorization to the given robot to enter the given shared space; and
responsive to determining a total number of robots that have entered but not yet exited the given shared space is less than the threshold amount, providing authorization to the given robot to enter the given shared space.

16. The method of claim 15, further comprising:
determining a priority for a plurality of robots that are to enter the shared space based at least in part on one or more characteristics of respective ones of the plurality of robots or based at least in part on one or more characteristics of tasks to be performed by the respective ones of the robots,
wherein the authorization is provided to the given robot based on the given robot's priority relative to the other ones of the plurality of robots that are to enter the shared space.

17. One or more non-transitory, computer-readable, media storing program instructions that, when executed on or across one or more processors, cause the one or more processors to:
cause respective sets of robot management information to be stored in a centralized repository for different types of robots and/or robots manufactured by different manufacturers that use different robot interfaces; and
generate, based on the respective sets of robot management information, instructions, using respective communication protocols in accordance with the respective sets of robot management information, to be provided to robots of a heterogenous robot fleet to assign tasks to the robots of the heterogenous robot fleet.

18. The one or more non-transitory, computer-readable, media of claim 17, further storing program instructions that, when executed on or across the one or more processors, cause the one or more processors to:
receive a request to enter a given shared space from a given one of the robots of the heterogenous robot fleet upon the given robot reaching an entry point for the given shared space;
determine a total number of robots that have entered but not yet exited the given shared space; and
responsive to determining the total number of robots that have entered but not yet exited the given shared space is greater than a threshold amount, refrain from providing authorization to the given robot to enter the given shared space; or
responsive to determining the total number of robots that have entered but not yet exited the given shared space is less than the threshold amount, provide authorization to the given robot to enter the given shared space.

19. The one or more non-transitory, computer-readable, media of claim 17, further storing program instructions that, when executed on or across the one or more processors, cause the one or more processors to:
receive sensor data from the robots of the heterogenous robot fleet or from attachable sensors attached to non-robot entities operating in the one or more facilities in which the robots of the heterogenous fleet operate; and
cause the sensor data to be stored in a centralized facility information repository for one or more facilities in which the robots of the heterogenous robot fleet operate.

20. The one or more non-transitory, computer-readable, media of claim 19, further storing program instructions that, when executed on or across the one or more processors, cause the one or more processors to:
implement a user interface providing a unified view of sensor data received from the robots of the heterogenous fleet and/or the attachable sensors.

\* \* \* \* \*